(No Model.)
C. E. LINCOLN.
SPOOL HOLDER.
No. 564,434. Patented July 21, 1896.
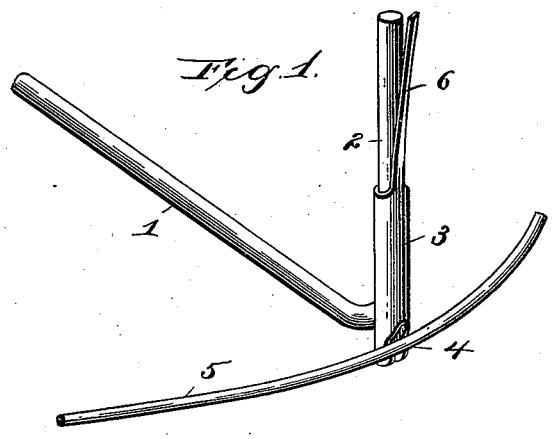
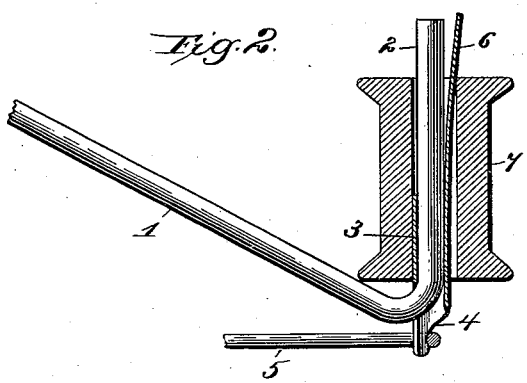
Witnesses:
E. C. Wurdeman
J. J. Williamson
Inventor
Clinton E. Lincoln
By Geo. H. Hogate
Attorney

UNITED STATES PATENT OFFICE.

CLINTON E. LINCOLN, OF MOREHEAD CITY, NORTH CAROLINA.

SPOOL-HOLDER.

SPECIFICATION forming part of Letters Patent No. 564,434, dated July 21, 1896.

Application filed November 19, 1896. Serial No. 569,424. (No model.)

*To all whom it may concern:*

Be it known that I, CLINTON E. LINCOLN, a citizen of the United States, residing at Morehead City, in the county of Carteret and State of North Carolina, have invented certain new and useful Improvements in Spool-Holders, of which the following is a specification.

My invention relates to a new and useful improvement in spool-holders for workstands, and has for its object to produce such a device which shall be very simple and cheap in construction, effective in operation, and by the use of which a spool will be held with sufficient tension to prevent its accidental rotation, whereby the cotton will become entangled, and also to provide means for severing a length of cotton.

With these ends in view the invention consists in the details of construction and combination of elements hereinafter set forth, and then specifically designated by the claims.

In order that those skilled in the art to which my invention appertains may understand how to make and use the same, I will describe its construction and operation in detail, referring by number to the accompanying drawings, forming a part of this specification, and in which—

Figure 1 is a perspective showing my improved device in connection with a support and retaining-wire, which are adapted to be secured to a suitable work-stand; and Fig. 2, a section showing a spool in position.

Similar numbers denote like parts in the views of the drawings.

1 is an arm which is secured in any convenient manner to a work-stand or the like, and is bent upward to form the spindle 2, and 3 is a sleeve of spring metal adapted to be passed over and supported by the spindle, and having a notch 4 formed in its lower end, with which the retaining-wire 5 engages, so as to prevent the sleeve from turning upon the spindle. This retaining-wire is secured in any convenient manner to the work-stand from which the arm 1 projects.

6 is a spring-finger extending upward from the sleeve upon one side of the spindle, and has an outward tension sufficient to retain the spool 7 against accidental rotation, and yet which will permit said spool to be rotated when sufficient strain is brought to bear upon the loose end of the cotton, so that said cotton may be drawn off the spool; and when a sufficient length has been thus drawn off it may be severed from the spool by giving it one or two turns around the upper end of the finger 6 and pulling on it with sufficient force to cause it to break around the sharp edges of said finger. This will leave the end of the cotton still wound around the finger, so that it will not become entangled with surrounding objects.

The fact that the spring-finger flares outward at its top serves to hold the spool upon the spindle against slight upward strain, as when the cotton is being drawn off.

It will of course be understood that any number of these arms and holders may be provided for a stand, so as to carry a number of spools.

Having thus fully described my invention, what I claim as new and useful is—

1. In a device of the character described, a spindle supported by an arm, a sleeve surrounding said spindle, a notch cut in the lower end of said sleeve, and means for preventing said sleeve from turning upon the spindle, and a spring-finger projecting upward and outward, whereby suitable tension is imparted to a spool that a length of cotton may be severed from said spool, as specified.

2. In a device of the character described, a wire bent to form a spindle and rest for a spool or the like, a sleeve surrounding the spindle and having a slot to fit over the bend, a spring formed by the upper end of the sleeve, and a notch formed in the lower end of the sleeve to be engaged by a wire, as and for the purpose described.

In testimony whereof I have hereunto affixed my signature in the presence of two subscribing witnesses.

CLINTON E. LINCOLN.

Witnesses:
S. S. WILLIAMSON,
J. B. ARENDELL.